United States Patent
Matsuo

(10) Patent No.: US 6,580,599 B2
(45) Date of Patent: Jun. 17, 2003

(54) ELECTRIC DOUBLE LAYER CAPACITOR AND ELECTROLYTE THEREFOR

(75) Inventor: Masashi Matsuo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/988,558

(22) Filed: Nov. 20, 2001

(65) Prior Publication Data
US 2002/0089809 A1 Jul. 11, 2002

(30) Foreign Application Priority Data
Nov. 21, 2001 (JP) ........................................ 2000-354521

(51) Int. Cl.⁷ ............................ H01G 9/02; B21F 41/00
(52) U.S. Cl. ..................... 361/504; 361/502; 361/503; 361/508; 361/512; 29/25.03
(58) Field of Search ................................ 361/502, 503, 361/508, 509, 511, 504, 505, 512, 523, 528, 517; 29/25.03

(56) References Cited

U.S. PATENT DOCUMENTS

| | | | | | |
|---|---|---|---|---|---|
| 5,565,543 | A | * | 10/1996 | Marrocco, III et al. | 528/183 |
| 5,616,794 | A | * | 4/1997 | Behr et al. | 562/851 |
| 5,969,936 | A | * | 10/1999 | Kawasato et al. | 361/502 |
| 6,094,338 | A | * | 7/2000 | Hirahara et al. | 361/502 |
| 6,236,560 | B1 | * | 5/2001 | Ikeda et al. | 361/502 |
| 6,335,857 | B1 | * | 1/2002 | Takimoto et al. | 361/502 |
| 6,349,027 | B1 | * | 2/2002 | Suhara et al. | 361/502 |

FOREIGN PATENT DOCUMENTS

JP          11-168035          6/1999

* cited by examiner

Primary Examiner—Dean A. Reichard
Assistant Examiner—Nguyen Ha
(74) Attorney, Agent, or Firm—Oblon, Spivak, McClelland, Maier & Neustadt, P.C.

(57) ABSTRACT

An electric double layer capacitor of an electrode containing a carbon material as the main component, and an electrolyte to form an electric double layer at the interface with the electrode, wherein the electrolyte is one having a salt of a quaternary onium containing a polyfluoroalkyl group dissolved in an organic solvent.

12 Claims, No Drawings

ELECTRIC DOUBLE LAYER CAPACITOR AND ELECTROLYTE THEREFOR

The present invention relates to an electric double layer capacitor and an electrolyte therefor.

As a shape of a conventional electric double layer capacitor, there may be a coin type wherein an element having a separator sandwiched between a pair of polarized electrodes composed mainly of activated carbon formed on current collectors, is accommodated together with an electrolyte in a metal casing, which is then sealed by a metal cover via a gasket, or a winding type wherein an element having a pair of polarized sheet electrodes wound with a separator interposed therebetween, is accommodated together with an electrolyte in a metal casing, which is then sealed so that the electrolyte will not evaporate from an opening of the casing.

Further, as one for a large current and large capacitance, a lamination type electric double layer capacitor has also been proposed wherein an element having many polarized sheet electrodes laminated via a separator disposed therebetween, is incorporated (JP-A-4-154106, JP-A-3-203311, JP-A-4-286108). Namely, rectangular polarized sheet electrodes are used as a positive electrode and a negative electrode, and they are alternately laminated with a separator interposed therebetween, to form an element, which is then accommodated in a casing in such a state that a positive electrode lead member and a negative electrode lead member are connected by caulking to the terminals of the positive and negative electrodes, respectively, then the element is impregnated with an electrolyte, and the casing is closed with a cover.

As an electrolyte for a conventional electric double layer capacitor, not only an aqueous type electrolyte containing a mineral acid such as sulfuric acid, an alkali metal salt or an alkali, but also a non-aqueous electrolyte having a quaternary ammonium salt or a quaternary phosphonium salt dissolved in an organic solvent such as a propylene carbonate, acetonitrile or sulfolane, has been used. When the withstand voltages are compared, the aqueous type electrolyte has a withstand voltage of 0.8 V, while the non-aqueous electrolyte has a withstand voltage of from 2.5 to 3.3 V. The electrostatic energy of a capacitor corresponds to the square of the withstand voltage. Accordingly, from the viewpoint of the electrostatic energy, the non-aqueous type electrolyte is more advantageous.

However, even when a non-aqueous electrolyte is employed, if the electric double layer is operated under a high voltage for a long period of time, deterioration will occur, and the capacitance will decrease or the internal resistance will increase. As one of factors for this deterioration, it is conceivable that if a high voltage is applied, the stability of the solute (electrolyte) in the electrolyte solution tends to be insufficient, and decomposition, etc. are likely to take place.

Accordingly, it is an object of the present invention to solve the above problems of the prior art, to provide a highly reliable electric double layer capacitor which can be operated at a high voltage and whereby a high output can constantly be obtained even when it is used for a long period of time, by employing an electrolyte having a high withstand voltage, and to provide such an electrolyte.

The present invention provides an electric double layer capacitor comprising an electrode containing a carbon material as the main component, and an electrolyte to form an electric double layer at the interface with the electrode, wherein the electrolyte is one having a salt of a quaternary onium containing a polyfluoroalkyl group dissolved in an organic solvent, and such an electrolyte for an electric double layer capacitor.

The electrolyte salt in the present invention has a cation containing a polyfluoroalkyl group and thus is stable. Therefore, the withstand voltage is high, and the durability is excellent even when the electric double layer capacitor is used for a long period of time, whereby deterioration such as an increase in the internal resistance or a decrease in the capacitance of the electric double layer capacitor is less likely to take place. Here, the polyfluoroalkyl group may, for example, be a $C_{1-12}$ perfluoroalkyl group, a —$CF_2H$ group, a —$CF_2CF_2H$ group, a —$CFClCF_3$ group, a —$CFClCF_2H$ group, a —$CFHCF_3$ group or a —$CFHCF_2H$ group. It is particularly preferred that the electrolyte salt contains a perfluoroalkyl group, whereby it is more stable and excellent in durability.

The above salt of the quaternary onium is preferably a salt represented by the formula $(R^f(CH_2)_n)_x(CH_3)_{4-x}A^+B^-$, whereby it is particularly excellent in the stability. Here, in the formula, $R^f$ is a $C_{1-12}$ perfluoroalkyl group, A is a nitrogen atom or a phosphorus atom, B is at least one member selected from the group consisting of $BF_4$, $PF_6$, Cl, $CF_3SO_3$, $AsF_6$, $N(SO_2CF_3)_2$, $NO_3$, $ClO_4$, Br and I, x is an integer of from 1 to 4, and n is an integer of from 1 to 10. Here, when x is an integer of 2 or more, the plurality of —$(CH_2)_nR^f$ groups may be the same or different from one another.

If the molecular weight of the electrolyte salt is too large, the electrolyte tends to be hardly present on the surface of pores of the electrode, or the solubility tends to be low, although such may depends also on e.g. the pore distribution of the carbon material used as the main component of the electrode. Accordingly, the carbon number of the —$R^f$ group in the above formula is preferably from 1 to 10, and n is preferably an integer of from 1 to 3.

Further, among the above salts of the quaternary onium, a salt represented by $(CF_3CH_2)(CH_3)_3N^+BF_4^-$ or $(CF_3CH_2)_2(CH_3)_2N^+BF_4^-$, is particularly preferred.

In the present invention, the solvent for the electrolyte is not particularly limited, and an organic solvent which is commonly used as a solvent for an electrolyte for an electric double layer capacitor, can be used. As such an organic solvent, preferred is at least one member selected from the group consisting of a carbonate such as propylene carbonate, butylene carbonate, diethyl carbonate or ethylmethyl carbonate, a lactone such as γ-butyrolactone, a sulfolane such as sulfolane or methylsulfolane, and acetonitrile. These solvents may be used alone or in combination as a solvent mixture of two or more of them.

In order to increase the electrical conductivity of the electrolyte, the higher the concentration of the solute, the better. However, if the concentration is too high, the viscosity tends to be high, whereby handling tends to be difficult. Accordingly, the concentration of the solute is preferably from 1.0 to 2.0 mol/l, more preferably from 1.2 to 1.8 mol/l.

The electrode to be used for the electric double layer capacitor of the present invention, contains a carbon material as the main component. The carbon material is preferably one having a specific surface area of from 500 to 3,000 $m^2/g$, more preferably from 700 to 2,500 $m^2/g$. Specifically, it may be activated carbon, carbon black or polyacene. It is particularly preferred to use a highly conductive carbon black as an electroconductive material and to use it as mixed with activated carbon. In such a case, the carbon black as an electroconductive material is preferably contained in an amount of from 5 to 20% in the total mass of the electrode.

If it is less than 5%, the effect of lowering the resistance of the electrode is small. Further, highly conductive carbon black is usually unable to increase the capacitance of an electric double layer capacitor so much as activated carbon. Accordingly, its content is preferably adjusted to be at most 20%.

In the present invention, the electrode containing the carbon material as the main component, preferably contains a binder such as polytetrafluoroethylene or polyvinylidene fluoride in order to maintain the strength and shape of the electrode itself. If the binder is too much, the capacitance of the electric double layer capacitor tends to be low, and if the binder is too little, the strength tends to be weak, and it will be difficult to maintain the shape of the electrode. Accordingly, the amount of the binder is preferably from 5 to 20% in the total mass of the electrode.

The electrode in the present invention is obtainable, for example, by kneading a mixture comprising the carbon material and polytetrafluoroethylene and then forming the mixture into a sheet. The electrode sheet thus obtained is preferably bonded to a metal current collector via an electrically conductive adhesive. Here, the metal current collector is preferably a foil of a metal such as aluminum or stainless steel. In a case where two sheets of the electrode are disposed to face each other via a separator and impregnated with the electrolyte and then accommodated in a coin-shaped casing, the casing and a cover may be made of a metal to let them have the functions as current collectors.

Otherwise, the carbon material may be dispersed in a liquid having a binder such as polyvinylidene fluoride dissolved or dispersed in a solvent, to obtain a slurry, and the slurry may be coated on a metal current collector to form an electrode.

Usually, the above-described electrodes are used as a positive electrode and a negative electrode to form an electric double layer capacitor. However, an electric double layer capacitor may be formed by using the above electrode as either a positive electrode or a negative electrode, and a non-polarized electrode containing a secondary cell active material capable of charging and discharging as the other electrode.

The electric double layer capacitor of the present invention may be used in any one of a coin type wherein an element having a separator sandwiched between a positive electrode and a negative electrode, is accommodated together with an electrolyte in a metal casing, and the casing is closed by a metal cover via a gasket, a winding type wherein an element having a positive electrode and a negative electrode wound with a separator interposed therebetween, is accommodated together with an electrolyte in a metal casing, and the casing is sealed, and a laminate type wherein an element having many sheet-shaped positive electrodes and negative electrodes are alternately laminated with a separator interposed therebetween, is incorporated.

Now, the present invention will be described in further detail with reference to Working Examples (Examples 1, 2, 3 and 5) and Comparative Examples (Example 4). However, it should be understood that the present invention is by no means restricted to such specific Examples.

EXAMPLE 1

Ethanol was added to a mixture comprising 80 mass % of coconut shell activated carbon having a specific surface area of 1,800 m$^2$/g, activated by steam, 10 mass % of polytetrafluoroethylene and 10 mass % of carbon black, followed by kneading and forming into a sheet shape, and then by rolling into a thickness of 0.6 mm, whereupon the obtained sheet was punched into discs having a diameter of 12 mm, which were used as a positive electrode and a negative electrode. Such disc-shaped positive electrode and negative electrode were bonded to the positive electrode side and negative electrode side insides, respectively, of a stainless steel casing serving as a current collector and a housing member for a coin-shaped cell by means of a graphite type conductive adhesive. Then, the entire assembly including the stainless steel casing was subjected to heat treatment under reduced pressure to remove moisture, etc.

Then, the positive electrode and the negative electrode were impregnated with an electrolyte having $(CF_3CH_2)(CH_3)_3NBF_4$ dissolved at a concentration of 1.5 mol/l in a solvent mixture comprising propylene carbonate and methylethyl carbonate in a volume ratio of 80:20. A separator sheet made of a polypropylene fiber non-woven fabric was sandwiched between the positive electrode and the negative electrode, and the stainless steel casing was caulked via a gasket as an insulator and sealed, to obtain a coin-shaped electric double layer capacitor having a diameter of 18.4 mm and a thickness of 2.0 mm.

EXAMPLE 2

A coin-shaped electric double layer capacitor was obtained in the same manner as in Example 1 except that as the electrolyte, a solution having $(CF_3CH_2)_2(CH_3)_2NBF_4$ dissolved at a concentration of 1.5 mol/l in a solvent mixture comprising propylene carbonate and ethylpropyl carbonate in a volume ratio of 75:25, was used.

EXAMPLE 3

A coin-shaped electric double layer capacitor was obtained in the same manner as in Example 1 except that as the electrolyte, a solution having $(CF_3CH_2)_2(n-C_3H_7)_2NBF_4$ dissolved at a concentration of 1.5 mol/l in a solvent mixture comprising propylene carbonate and methylethyl carbonate in a volume ratio of 70:30, was used.

EXAMPLE 4

Comparative Example

A coin-shaped electric double layer capacitor was obtained in the same manner as in Example 1 except that as the electrolyte, a solution having $(C_2H_5)_3(CH_3)NBF_4$ dissolved at a concentration of 1.5 mol/l in a solvent mixture comprising propylene carbonate and methylethyl carbonate in a volume ratio of 80:20, was used.

EXAMPLE 5

A coin-shaped electric double layer capacitor was obtained in the same manner as in Example 1 except that the positive electrode and the negative electrode were prepared by using a carbon material having a specific surface area of 2,000 m$^2$/g, prepared by baking a resole resin at 650° C. in a nitrogen atmosphere and subjecting it to activation treatment with molten KOH, instead of the steam activated coconut shell activated carbon, and as the solvent for the electrolyte, a solvent mixture comprising propylene carbonate and methylethyl carbonate in a volume ratio of 90:10, was employed.

Evaluation

With respect to each of the electric double layer capacitors of Examples 1 to 5, the discharge capacitance and the internal resistance were measured at 25° C. Here, the internal resistance was calculated from the voltage drop at each discharge current. The discharge was carried out at 0.5 mA from 2.5 V to 1.0 V. Further, a voltage-applied durability test was carried out under conditions of 70° C. at 2.8 V for 1,000 hours, and the discharge capacitance and the internal resistance after the test, were measured. The results are shown in Table 1.

TABLE 1

|  | Initial stage | | After the durability test | |
| --- | --- | --- | --- | --- |
|  | Capacitance (F) | Internal resistance ($\Omega$) | Capacitance (F) | Internal resistance ($\Omega$) |
| Example 1 | 2.30 | 6.5 | 2.10 | 9.8 |
| Example 2 | 2.25 | 6.3 | 2.03 | 10.1 |
| Example 3 | 2.19 | 6.8 | 1.97 | 10.2 |
| Example 4 | 2.11 | 8.5 | 1.48 | 25.5 |
| Example 5 | 2.43 | 5.1 | 2.19 | 7.7 |

The electric double layer capacitor of the present invention has a high withstand voltage and can be operated at a high voltage, whereby the energy density is high. Further, even when operated at a high voltage, it presents a constant performance for a long period of time.

The entire disclosure of Japanese Patent Application No. 2000-354521 filed on Nov. 21, 2000 including specification, claims and summary are incorporated herein by reference in its entirety.

What is claimed is:

1. An electric double layer capacitor comprising an electrode containing a carbon material as the main component, and an electrolyte to form an electric double layer at the interface with the electrode, wherein the electrolyte is one having a salt of a quaternary onium containing a polyfluoroalkyl group dissolved in an organic solvent.

2. The electric double layer capacitor according to claim 1, wherein the polyfluoroalkyl group is a perfluoroalkyl group.

3. The electric double layer capacitor according to claim 2, wherein the salt of the quaternary onium is a salt represented by the formula $(R^f(CH_2)_n)_x(CH_3)_{4-x}A^+B^-$ wherein $R^f$ is a $C_{1-12}$ perfluoroalkyl group, A is a nitrogen atom or a phosphorus atom, B is at least one member selected from the group consisting of $BF_4$, $PF_6$, Cl, $CF_3SO_3$, $AsF_6$, $N(SO_2CF_3)_2$, $NO_3$, $ClO_4$, Br, I and OH, x is an integer of from 1 to 4, and n is an integer of from 1 to 10.

4. The electric double layer capacitor according to claim 3, wherein the salt of the quaternary onium is $(CF_3CH_2)(CH_3)_3N^+BF_4^-$ or $(CF_3CH_2)_2(CH_3)_2N^+BF_4^-$.

5. The electric double layer capacitor according to claim 1, wherein the organic solvent is at least one member selected from the group consisting of propylene carbonate, butylene carbonate, diethyl carbonate, ethylmethyl carbonate, γ-butyrolactone, sulfolane, methylsulfolane and acetonitrile.

6. The electric double layer capacitor according to claim 5, wherein the polyfluoroalkyl group is a perfluoroalkyl group.

7. An electrolyte for an electric double layer capacitor, which comprises a solution having a salt of a quaternary onium having a polyfluoroalkyl group dissolved in an organic solvent.

8. The electrolyte for an electric double layer capacitor according to claim 7, wherein the polyfluoroalkyl group is a perfluoroalkyl group.

9. The electrolyte for an electric double layer capacitor according to claim 8, wherein the salt of the quaternary onium is a salt represented by the formula $(R^f(CH_2)_n)_x(CH_3)_{4-x}A^+B^-$ wherein $R^f$ is a $C_{1-12}$ perfluoroalkyl group, A is a nitrogen atom or a phosphorus atom, B is at least one member selected from the group consisting of $BF_4$, $PF_6$, Cl, $CF_3SO_3$, $AsF_6$, $N(SO_2CF_3)_2$, $NO_3$, $ClO_4$, Br, I and OH, x is an integer of from 1 to 4, and n is an integer of from 1 to 10.

10. The electrolyte for an electric double layer capacitor according to claim 9, wherein the salt of the quaternary onium is $(CF_3CH_2)(CH_3)_3N^+BF_4^-$ or $(CF_3CH_2)_2(CH_3)_2N^+BF_4^-$.

11. The electrolyte for an electric double layer capacitor according to claim 7, wherein the organic solvent is at least one member selected from the group consisting of propylene carbonate, butylene carbonate, diethyl carbonate, ethylmethyl carbonate, γ-butyrolactone, sulfolane, methylsulfolane and acetonitrile.

12. The electrolyte for an electric double layer capacitor according to claim 11, wherein the polyfluoroalkyl group is a perfluoroalkyl group.

* * * * *

UNITED STATES PATENT AND TRADEMARK OFFICE
CERTIFICATE OF CORRECTION

PATENT NO.   : 6,580,599 B2
DATED        : June 17, 2003
INVENTOR(S)  : Matsuo

It is certified that error appears in the above-identified patent and that said Letters Patent is hereby corrected as shown below:

<u>Title page,</u>
Item [30], the Foreign Application Priority Data is incorrect. It should read -- [30]    Foreign Application Priority Data

Nov. 21, 2000    (JP) ………………….. 2000-354521 --

Signed and Sealed this

Seventh Day of October, 2003

JAMES E. ROGAN
*Director of the United States Patent and Trademark Office*